United States Patent [19]
Pramstraller

[11] 3,890,043
[45] June 17, 1975

[54] ENLARGING APPARATUS FOR USE IN A BRIGHT ROOM

[75] Inventor: Wilmuth Pramstraller, Brixen near Bozen, Italy

[73] Assignee: Durst S.p.A. Fabbrica Macchine ed Apparecchi Fototecnici, Bolzano, Italy

[22] Filed: Sept. 20, 1973

[21] Appl. No.: 399,051

[30] Foreign Application Priority Data
Oct. 3, 1972 Italy.................................. 30007/72

[52] U.S. Cl. .................................................. 355/62
[51] Int. Cl. .............................................. G03b 27/52
[58] Field of Search ............ 355/28, 44, 45, 64, 74, 355/61, 62

[56] References Cited
UNITED STATES PATENTS

| | | | |
|---|---|---|---|
| 1,141,704 | 6/1915 | French.................. | 355/74 |
| 1,834,218 | 12/1931 | MacDonald ........... | 355/64 |
| 1,894,004 | 1/1933 | Rose..................... | 355/45 |
| 2,256,385 | 9/1941 | Evans.................... | 355/45 |
| 2,335,189 | 11/1943 | Mayer................... | 355/44 |
| 2,938,427 | 5/1960 | Alyes.................... | 355/45 |
| 2,997,919 | 8/1961 | Peck..................... | 355/56 |
| 3,167,996 | 2/1965 | Adler.................... | 355/28 |
| 3,674,366 | 7/1972 | Callahan................ | 355/55 |

Primary Examiner—John M. Horan
Attorney, Agent, or Firm—Connolly and Hutz

[57] ABSTRACT

An enlarging apparatus for use in a lighted room has a light-tight housing containing all of its components including a light source and a removable transparency holder. The picture to be copied is projected on a projection surface mounted in an opening in the wall of the housing opposite the light source. A swinging mirror is interposed between the projection surface and an image-viewing window screen in the front wall of the housing which also includes the controls. One of the controls adjusts the focusing and focal distance of the variable projection optics from the projection plane and image-viewing window screen. The window screen has several sets of markings, which help determine the size and format of the projected image as it is focused on the window screen. After focusing, the swinging mirror is swung outwardly away from the path of the projected light rays against the image viewing window screen to seal it off. The opening in front of the projection surface is also sealed by cover which is oppositely hinged from the swinging mirror to prevent exposure of the photographic paper until the swinging mirror has completely covered the image-viewing window screen. The cover is moved back in front of the photographic paper to seal it off from extraneous light before the swinging mirror can return to its inclined position. The photographic paper is contained within a magazine in either roll or sheet form.

11 Claims, 3 Drawing Figures

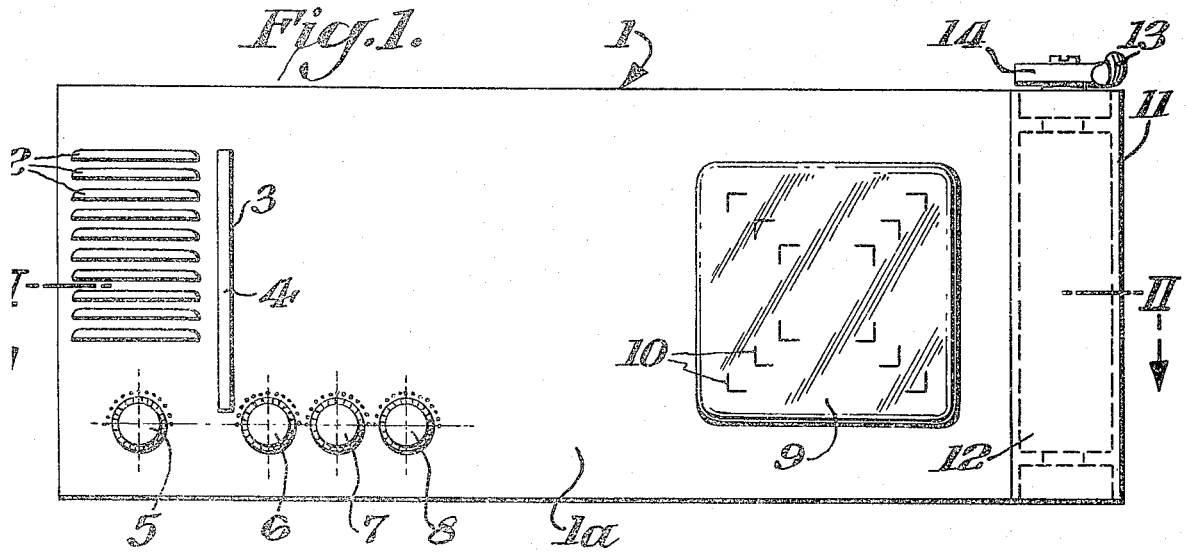
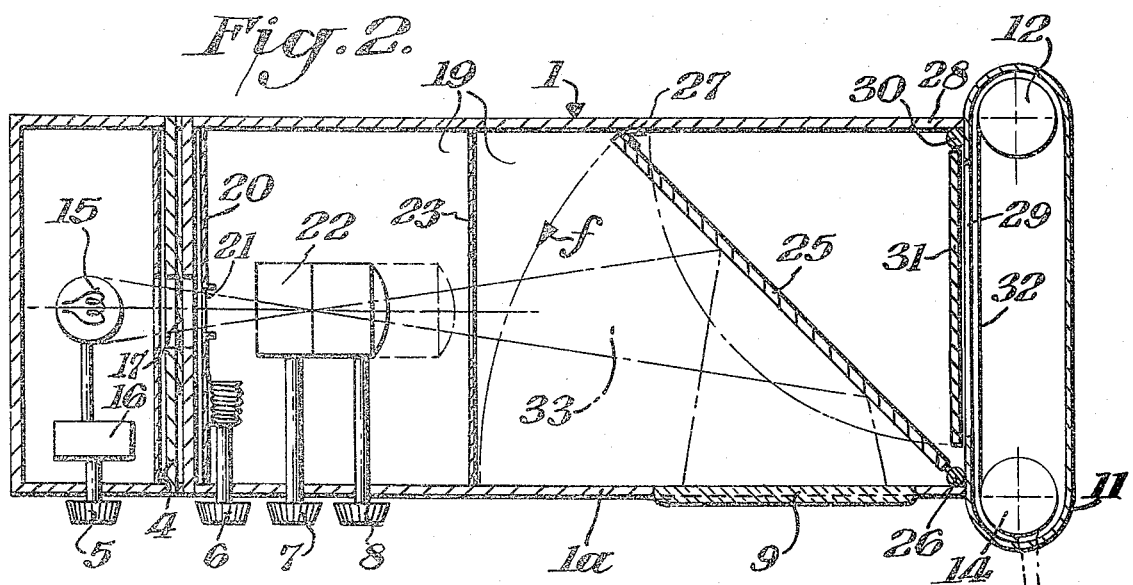
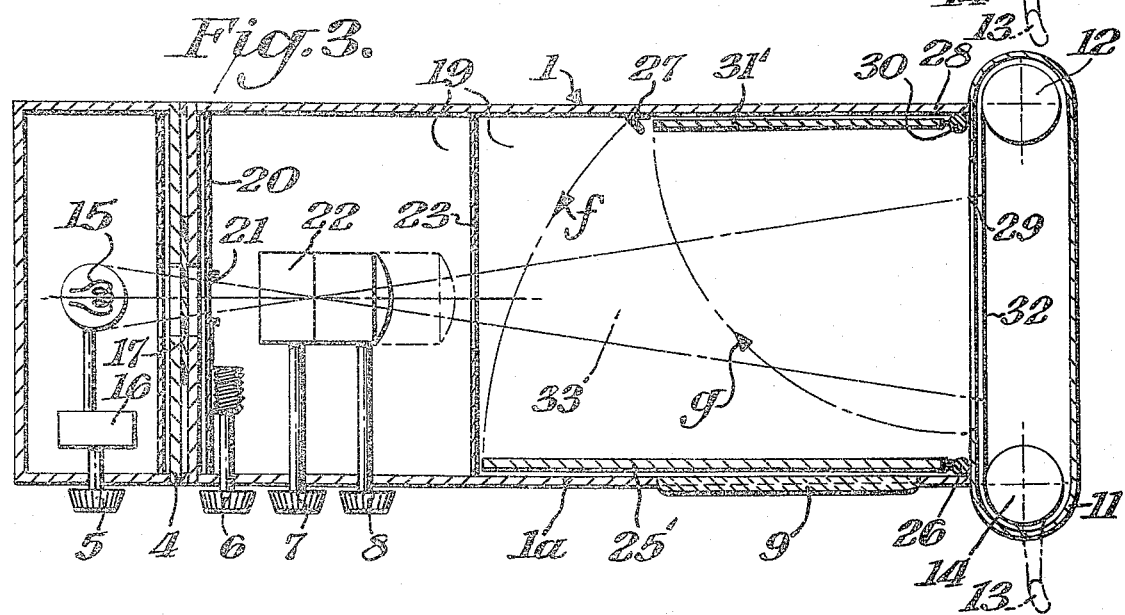

ENLARGING APPARATUS FOR USE IN A BRIGHT ROOM

BACKGROUND OF THE INVENTION

This invention relates to an enlarging apparatus for use in a lighted room. An enlarging apparatus is known which may be in a light room. This apparatus developed from a conventional enlarger used customarily in a darkroom, wherein the objective plane is connected with the copy plane by means of light-tight bellows in order to protect it from distrubing light incidence. The photographic paper to be exposed is inserted into the enlarger using light-tight flat magazines, which had been previously loaded in a darkroom. The setting of the desired enlarging scale and the focusing of the projected picture is accomplished by changing the distance between the objective plane and the projection plane or between the objective plane and the transparency plane. This requires in the known enlarging apparatus a movement of the structural units connected together by means of the bellows, wherein the apparatus is cumbersome to handle and imposes great demands structurally on the trueness of the guideways if the quality of the enlargements is not to be impaired. In addition, it is difficult to seal the projection plane when the major constructional units must be relatively movable and the operational units must engage with the sealed chamber, such as is the case in the stated apparatus.

A particular disadvantage of the known apparatus is that the image viewing, required for the focusing as well as for the setting of a desired enlarging scale, of the picture projected on the projection surface, must be accomplished through a small window, which is uncomfortable to use and in addition must be screened against light incidence during the exposure procedure. This necessity may lead to erroneous exposures if utmost care is not exerted and furthermore produces additional light sealing problems.

A further disadvantage of the known apparatus is that the control units may not be associated in a manner which permits comfortable and precise operation. All setting operations must be undertaken by means of lever bars, sleeved rods and clamping devices. These auxiliary devices do not only make the apparatus significantly more expensive but also impair the exactness and precision which are necessary in enlarging apparatus to obtain satisfactory performance.

SUMMARY

The object of the invention is to avoid the aforementioned disadvantages and to provide an enlarging apparatus to use in a lighted room consisting of a convenient apparatus accommodated in a firm housing, wherein the fewest possible movable units are present, wherein all setting procedures may be undertaken by means of simple control units, and wherein comfortable viewing of the projected picture image may taken place, so that it may also be used as a slide viewing apparatus.

This problem is solved by an enlarging apparatus usable in a lighted room, which is characterized in that in a light-tight housing there are provided a light source as weell as a device, fixed in the direction of the longitudinal axis of the housing, to form the main transparency holding plane and connected thereto a stationary diaphragm, having an adjustable aperture, as well as a variable projection optic unit, continuously variable in its focal length; that the wall of the housing opposite the light source has an opening for the projection of the picture to be copied on a projection surface formed of lightsensitive photographic paper; an image viewing window screen is provided in a wall normally arranged to the projection surface and that on an angle intersecting the projection surface and the image viewing window screen there is provided a swinging mirror which may be turned about an axis provided parallel to the projection surface and to the picture image viewing screen. In an advantageous manner it is provided that for controlling and activating the light source, the diaphragm, the variable projection optics as well as the entire exposure procedure, there are provided on a control wall outside the apparatus, control and regulating devices. In this connection, the picture image viewing screen is mounted with a particular advantage on the control side of the apparatus. A further advantage of this novel invention is that the picture image viewing screen is provided with markings for determining the desired picture format. In a preferred embodiment of the apparatus, the photographic paper forming the projection plane is contained in a light-tight magazine attachable at the outlet of the path of rays. This magazine may contain the photographic paper in roll form, for example, but also in the form of individual sheets. In a further embodiment of the novel apparatus, the advance of the photographic paper, contained in roll form in the magazine, may occur by means of a suitable lever drive.

In a further advantageous embodiment, it may be provided that the magazine holding the roll-shaped paper has a light-tight connection with a cutting device, which provides an equally light-tight connected developing device with exposed photographic paper.

In an advantageous manner, the outlet provided before the projection surface at the end of the path of rays may be sealed light-tight by a cover.

Furthermore, it has been shown to be advantageous that for the setting of the apparatus and for the determination the format, the swinging mirror is maintained in an inclined position and for the exposure of the photographic paper is flipped towards and against the picture image viewing screen.

The opening before the projection plane is exposed for the exposure of the photographic paper only when the swinging mirror has completely covered the picture image viewing screen to avoid distrubing light penetration. Furtheremore, it is advantageous that the exposed material has been screened off by the cover before the mirror returns to its inclined position.

A further advantage of the invention consists of having all procedures necessary for the exposure of the photographic paper proceed, automatically controlled, upon the setting of the apparatus and determination of the desired enlarging format.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a front view in elevation of an enlarger constructed as a table apparatus, which is one embodiment of this invention;

FIG. 2 is a cross-section through the enlarger shown in FIG. 1 along the line II—II with the swinging mirror in operatiog position and with covered projection surface, and FIG. 3 is a cross-section through the enlarger shown in FIG. 1, also along lines II—II but with actuated mirror and exposed projection surface for exposure of the photographic paper.

DESCRIPTION OF THE PREFERRED EMBODIMENTS

The enlarging apparatus, constructed of a light-tight housing for using in a lighted room, on its control side 1a has numerous ventilating louvers 2 which serve for the cooling of a light source accommodated in a housing 1. In a direct proximity to the ventilating louvers 2 is a narrow rectangular inlet 3 in the wall of housing 1, which serves for the insertion of a transparency holder 4 for receiving a transparency within the interior of the housing, such as a negative to be projected. For controlling and activating the light source and for controlling the optics as well as the exposure procedure, there are further provided actuating knobs 5, 6, 7 and 8 on the control side 1a of housing 1, which will be discussed later. The front or control side 1a of enlarger 1 further has a picture image viewing window screen 9 having markings 10 for determining the desired size and format of the projected picture.

On the end of housing 1 situated opposite the air louvers 2 there may be mounted a light-tight magazine 11, which holds photo-sensitive copying paper in the form of a roll 12, for example. An advancing device 14, actuated by lever 13, is provided for moving the paper roll or strips forward.

As shown by the cross-sectional illustration in FIG. 2, in the interior of housing 1 there is provided a stationary light source 15 whose light intensity or whose exposure time is determined by a controlling device 16, which may be set and released by means of regulating knob 5. In front of light source 15 there is provided a holder 4 by means of which a transparency, such as film negative 17, may be inserted into the path of rays 19 of housing 1. Between light source 15 and film holder 4, suitable means may be provided which assure a uniform illumination of the negative to be copied.

Next to the film holder 4, a diaphragm 20 is inserted into the path of rays 19, whose diaphragm aperture 21 may be adjusted by the actuation of control knob 6. Next to diaphragm 20, there is provided in the path of rays 19 a variable projecting lens 22 whose focusing may be accomplished by means of control knob 7. Actuating knob 8 is provided for the continuous variation of the focal length of the variable lens 22 or its focusing distance from the projection plane or surface.

Diaphragm 20 as well as the variable lens 22 may be combined into a compact structural unit whose setting takes place by means of customary means from the outside of housing 1.

Furthermore, there exists the possibility of providing one or several suppression filters 23, which may be inserted into the path of rays 19 at will. On the control side 1a of housing 1 there may further be mounted a picture image viewing window screen 9 in whose immediate proximity is arranged a swinging mirror 25 which may be swung about an axis 26 and whose top end position (FIG. 2) is determined by a stop 27. Housing wall 28 situated opposite the light source 15 has an opening 29, which may be sealed off by a cover 31 swingable about an axis of rotation 30.

On the side of wall 28 of housing 1, magazine 11 may be light-tightly mounted. It contains the photo-sensitive paper strip 32 in the form of a roll 12. For the transporting movement of the paper strip 32, there is provided in an advantageous manner an advancing device 14, which may be actuated by means of a schematically illustrated lever 13. However, it is also possible to mount at the same place a magazine 11 containing the photo-sensitive paper in the form of individual sheets.

In the inclined position of mirror 25, shown in FIG. 2, which is arranged on an angle bisecting the right angle formed by the plane of the picture image-viewing screen 9 and the projection plane of the paper strip 32, the light beam 33 passing from the light source 15 through negative 17 and emerging from lens 22 is deflected in such a manner that the picture to be transferred is projected on the picture image-viewing screen 9.

By the actuation of the control knobs 7 and 8, focusing of the picture projected on picture screen 9 may be accomplished, and in addition, by changing the focal length and focusing distance of lens 22 and using markings 10 of picture screen 9, a desired format size may be set. Since picture image-viewing window screen 9 makes it extremely convenient and comfortable to view the projected image picture, the apparatus may also be used as a diapositive slide-viewing apparatus. In this instance, it is advantageous to replace the film holder 4 by a to-and-fro-movable device (not illustrated) for receiving framed diapositive slides. If the apparatus is used as an enlarger, the exposure is performed after focusing the picture formed on the image viewing screen 9 and after the determining the desired format. This may occur, for example, by the actuation of a non-illustrated tripping device which controls and carries out the exposure process using known devices.

If the exposure phase is accomplished by the actuation of a non-illustrated tripping device, mirror 25 is flipped from its inclined position illustrated in FIG. 2 in the direction of arrow f into position 25' in which image viewing window screen 9 is light-tightly sealed off by hinged mirrow 25 in order to avoid any incidence of distrubing daylight through image-viewing window screen 9.

In order to avoid any light incidence through picture image-viewing window 9, even during the short movement of mirror 25 into its position 25' outlet 29 of wall 28 is light-tightly sealed off by cover 31, which is swung, only after the mirror has reached position 25' in the direction of arrow g (FIG. 3) to thus release passage opening 29 and paper strip 32 to be exposed for the exposure by light beam 33.

Now light beam 33, produced by light source 15 for transferring the picture, may illuminate paper strip 32 without obstruction.

Upon completion of the exposure phase, cover 31 is moved from position 31' again towards the light passage opening 29 to seal off the photographic paper 32 from further extraneous light incidence. Only after a complete sealing off of the photographic paper 32 by cover 31, can the swinging mirror move again from its position 25' into its inclined position, in which abuts stop 27.

By a further forward movement of the paper strip 32 by the actuation of the advance lever 13 of advance device 14, a further piece of the paper strip 32 is brought into position required for exposure before the passage opening 29. There also exists the possibility of providing on magazine 11 a light-tightly arranged cutting device and connected thereto a developing device (not illustrated). This is particularly advantageous when it is important to obtain an extremely rapid preparation of photoprints. In this case, the developing device may also consist of an automatic developing machine.

I claim:

1. An enlarging and viewing apparatus for use in a light room, comprising a rigid light-tight housing, the following components in said housing, a light source, a transparency-holding insert means for holding a transparency to be projected in front of the light source, variable projection optics which is variable in focal length, the wall of said housing opposite said light source having an opening for the projection of the picture to be copied on a projection surface disposed in said opening and having means for mounting light-sensitive photographic paper on said projection surface, an image-viewing window in a wall of said housing normally arranged to said projection surface, a swinging mirror having an axis of rotation at one side of said housing whereby it may be positioned at an angle between said projection surface and said image-viewing window screen for projecting an image on said window for adjusting it and whereby it may be swung out of the path of light projected to said projection surface for exposing said photographic paper, focal length control means on said variable projection optics for continuously varying the size and format of the picture projected on said projection surface, said opening in the path of light rays being light-tightly sealed in front of said projection surface by means of a cover, said swinging mirror being constructed and arranged to be maintained in an inclined position, for the adjustment of the apparatus for viewing the transparency and for the determination of the format to be copied, said swinging mirror being constructed and arranged to be moved toward and contiguous to said image-viewing window into a position which covers it and seals it for the exposure of said photographic paper, said swinging mirror and said cover also being constructed and arranged to permit exposure of the photographic paper, control actuating devices for said apparatus being mounted upon a control wall of said housing, said control actuating devices being operable from outside said control wall, said cover has a hinge connected on one of said walls adjacent said outlet, and the axis of rotation of said swinging mirror is mounted at said inlet upon another of said walls.

2. An enlarging and viewing apparatus according to claim 1, wherein said transparency holding unit comprises a slidable frame.

3. An enlarging and viewing apparatus according to claim 1, wherein said image-viewing window is disposed in said control wall.

4. An enlarging apparatus according to claim 3, wherein said image viewing window is provided with different sets of size and format markings whereby the desired picture format is obtained.

5. An enlarging and viewing apparatus according to claim 1, wherein further insert means is provided in said housing for inserting filters into the path of rays from said light source.

6. An enlarging and viewing apparatus according to claim 1, wherein said photographic paper mounted upon said projection surface is contained in a light-tight magazine mountable at said opening in the path of rays from said light source.

7. An enlarging and viewing apparatus according to claim 6, wherein said photographic paper is contained as roller material in said light-tight magazine.

8. An enlarging apparatus according to claim 7, characterized in that the advance of said photographic paper takes place by means of an advance device actuated by a lever which is connected to said magazine.

9. An enlarging apparatus according to claim 1, wherein said transparency holding insert is constructed and arranged for holding diapositive slides, and in this respect said swinging mirror is disposed in its inclined position, whereby said apparatus is constituted as a diapositive slide viewer.

10. An enlarger according to claim 1, wherein said hinge and axis of rotation are mounted parallel to opposite walls of said housing.

11. An enlarger according to claim 1, wherein the angled position of said swinging mirror bisects the angle between the planes of said image-viewing window screen and said projection surface.

* * * * *